June 24, 1947.  W. J. RADY ET AL  2,422,925
RESISTANCE UNIT FOR BATTERY FILLER PLUGS
Filed July 23, 1945
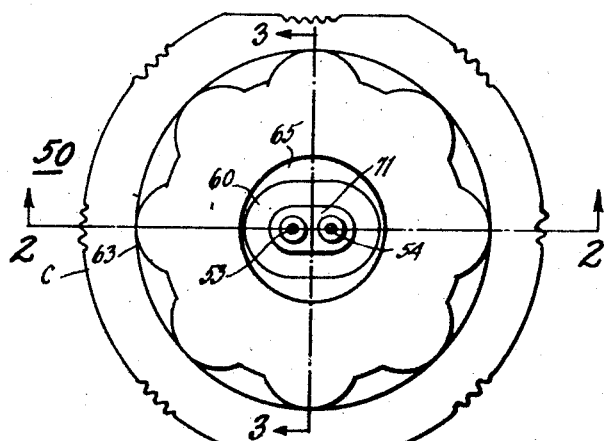
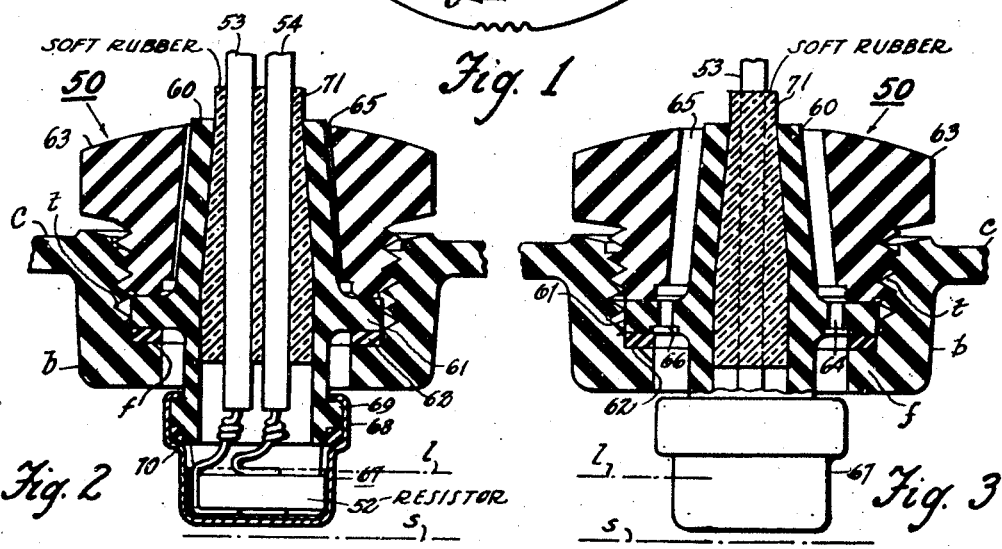
Fig. 1   Fig. 2   Fig. 3
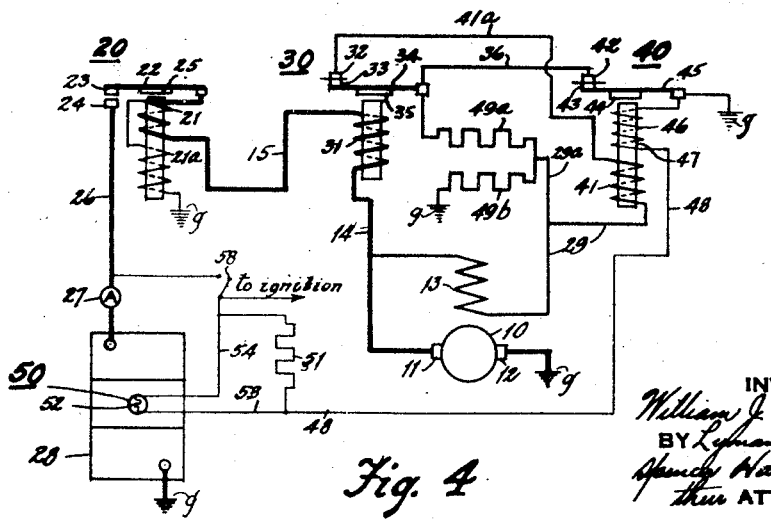
Fig. 4
INVENTORS
William J. Rady and
BY Lyman A. Rice
their ATTORNEYS Patented June 24, 1947

2,422,925

UNITED STATES PATENT OFFICE 2,422,925

RESISTANCE UNIT FOR BATTERY FILLER PLUGS

William J. Rady and Lyman A. Rice, Anderson, Ind., assignors to General Motors Corporation, Detroit, Mich., a corporation of Delaware Application July 23, 1945, Serial No. 606,667

3 Claims. (Cl. 136—181)

This invention relates to the regulation of battery charging voltage in accordance with battery temperature. A system of battery charging generator voltage regulation sensitive to battery temperature is disclosed in the copending application of William J. Rady, Serial No. 606,668, filed July 23, 1945. This system includes a voltage regulator magnet coil in series with a resistance unit comprising parallel resistances, one of which is composed of material having negative temperature coefficient of resistance which increases as temperature decreases, and the other resistance element is made of material having substantially zero temperature coefficient of resistance, the values of the resistances of the element being such that the unit has substantially constant negative temperature coefficient of resistance within the range of battery operating temperatures. At least the element having negative temperature coefficient of resistance is located in heat-receiving relation to the battery.

It is an object of the present invention to provide a unitary structure containing at least the resistance element having negative coefficient of resistance, said structure being adapted to be attached to the cover of a storage battery cell without making any change to the cover.

More particularly it is an object to provide a unit that can be inserted into the battery cell through the filler opening of the cover and to be supported upon the usual flange of the filler opening and to be secured into position by a filler opening plug substituted for the conventional plug. The unit and the plug provide for venting of the storage battery cell.

Further objects and advantages of the present invention will be apparent from the following description, reference being had to the accompanying drawings wherein a preferred embodiment of the present invention is clearly shown.

In the drawings:

Fig. 1 is a plan view of a portion of a storage battery cell cover with the resistance unit and plug in position.

Fig. 2 is a sectional view on line 2—2 of Fig. 1.

Fig. 3 is a sectional view on line 3—3 of Fig. 1.

Fig. 4 is a wiring diagram illustrating the use of the unit.

Referring to Figs. 1, 2 and 3 the cover $c$ provides an annular boss $b$ for providing a ledge or flange $f$ and a screw threaded portion $t$ adapted to receive either the conventional vented filler plug or a special plug to be described.

In Fig. 2 the line $s$ denotes the level of the tops of the storage battery separators and line $l$ denotes the normal level of the electrolyte.

The filler opening of the cover $c$ is adapted to receive a resistance unit 50 which includes an acid-proof housing 60 having a flange 61 of such diameter as to clear the threads $t$ and to rest upon flange $f$ with an acid-proof resilient gasket 62 therebetween. The unit 50 is secured in the position shown in Figs. 2 and 3 by a special plug 63 which replaces the conventional vent plug. As the plug 63 is screwed into the filler opening its bottom surface engages flange 61 of the unit 50 and forces it down into the gasket 62. In order that the battery cell may be vented, the flange 61, shown in Fig. 3, is provided with holes 64 leading to the space 65 which is between the unit 50 and the opening through the plug 63. As it might be possible so to squeeze the gasket 62 that it might cover the holes 64, these holes are provided with counterbored portions 66 which would not be covered by the gasket 62 even though it were considerably flattened.

The unit 50 includes a resistance element 52 having negative temperature coefficient of resistance located within a lead box 67 so shaped as to provide an internal annular groove 68 which fits around an annular flange 69 provided by the housing 60 and around a sealing ring 70. The lead box 67 which locates the element 52 below the level of the electrolyte $l$ protects the element 52 from battery acid. The leads 53 and 54 of the element 52 extend through a soft rubber grommet 71 which completely fills the opening in the housing 60 through which these leads extend.

The unit 50 is adapted for use in a battery charging system such as disclosed in Fig. 4. Referring to Fig. 4, a generator 10 having brushes 11 and 12 and a shunt field 13 charges a storage battery 28 through the circuit shown in heavy lines. This circuit includes brush 11, wire 14, actuator coil 31 of current regulator 30, wire 15, current responsive coil 21 of reverse current relay 20, spring blade 22 carrying relay armature 25 and contact 23, contact 24, wire 26, ammeter 27, battery 28 and ground connections $g$ to generator brush 12. The generator shunt field circuit across the charging line is shown in medium lines in Fig. 4. It includes brush 11 and field coil 13 and three parallel resistance paths to ground. One path is wire 29, coil 41 of voltage regulator 40, wire 41a, normally closed contacts 32 and 33 of current regulator 30, spring blade 34, carrying armature 35, wire 36, contacts 42 and 43 of voltage regulator 40, spring blade 45 carrying armature 44 and ground connection $g$ to generator brush 12. Another path is wire 29a branching from wire 29, resistance 49a, wire 36, normally closed contacts 42 and 43 of voltage regulator 40, armature spring blade 45 and ground g. Another path is wire 29a, resistance 49b and ground g. The first mentioned path has relatively low resistance and normally carries most of the field current; and it provides a normally closed short circuit of resistances 49a and 49b. The circuit of the actuating coil 46 of the voltage regulator 40 is shown in fine lines in Fig. 4. This circuit includes a switch 58 connected with wire 26 and connected with parallel resistances, one of which is the resistance 52 of unit 50 and the other of which is the resistance 51 of substantially zero temperature coefficient of resistance. The parallel resistances 51 and 52 are connected by wire 48 with the actuating coil 46 of the voltage regulator 40, said coil being grounded on the voltage regulator magnet core 47 which is grounded at g. Switch 58 controls not only the circuit of the coil 46 but also the ignition circuit.

Coil 46 of the voltage regulator 40 is responsive to the voltage at which the battery is charged by the generator. When this voltage extends a certain amount, the contact 43 will be separated from contact 42 of the regulator 40 thereby interrupting a circuit which includes the magnet coil 41 and which had short circuited the resistance 49b. Field current is reduced and, consequently, generator voltage falls. Magnetism of the voltage regulator magnet quickly falls due to decrease in generator voltage and to opening the circuit of coil 41. Blade 45 causes the contact 43 to reengage the contact 42 and the interrupted short circuit of resistance 49b which includes magnet coil 41 is reestablished. The generator field current and the generator voltage quickly increases and the magnetism of the voltage regulator magnet is quickly increased due to increase of voltage impressed on coil 46 and due to rendering the coil 41 effective. Thus the voltage regulator armature 44 and contact 43 are caused to vibrate rapidly to maintain the generator voltage within predetermined limits.

When the current in coil 31 of the current regulator 30 exceeds a certain value, contact 33 separates from contact 32 to render resistances 49a and 49b, in parallel, effective to reduce the current in field winding 13, hence generator voltage and current output. Reduction in current output results in reengagement of contacts 32 and 33, increase in field current, generator voltage and generator current output and the separation of the contacts 32 and 33. The vibratory action of the blade 35 and contact 33 will continue so long as the current output tends to exceed that for which the current regulator is set to operate.

Since the coil 46 is subjected to charging voltage less the voltage drop across the parallel resistance elements 51 and 52 and since the resistance of element 52 varies with battery temperature, the limitation of battery charging voltage by the voltage regulator is sensitive to battery temperature. As disclosed in the copending application referred to, the material of which element 52 can be made has a negative temperature coefficient of resistance which increases as temperature decreases. For example the resistance of element 52 at 60° F. is 3 ohms. By the combination of suitable amounts of the materials of resistance elements 51 and 52 the combined effect of these elements in parallel is that of a resistance having substantially constant negative temperature coefficient of resistance within the temperature range of the battery, for example, between 0° F. and 120° F. Thus the regulated voltage is caused to decrease fairly uniformly as temperature increases and vice versa.

Since the effect of temperature on the resistance of element 51 of substantially zero, it can be located anywhere. For example, it may be mounted on the ignition switch 58 having terminals 58a and 58b between which the element 51 is connected and to which the leads 53 and 54 of element 51 of unit 50 are connected. If a resistance material were available having substantially constant negative temperature coefficient of resistance within the range of battery operating temperatures, the element 51 could be omitted.

A battery charging system can be easily adapted for the control of charging voltage in response to battery temperature. Remove the filler cap or plug of the center cell of the battery and replace it with the unit 50 secured by the plug 63. Connect the non-grounded terminal of the voltage regulator main control coil through the parallel resistance elements with the ignition terminal of the ignition switch as shown in Fig. 4.

While the embodiment of the present invention as herein disclosed, constitutes a preferred form, it is to be understood that other forms might be adopted, all coming within the scope of the claims which follow.

What is claimed is as follows:

1. A resistance unit for use in a battery charging system having a voltage regulator sensitive to battery temperature comprising, a battery cell cover having an internally threaded filler opening and having an internal annular flange; a tubular body of acid resisting material adapted to be mounted in the filler opening, said body having means extending from its tubular part and adapted to be supported by the flange of the cover and providing for the venting of the battery, said body extending below the cover; a thin wall cell member of acid resisting material attached to the body at the end within the battery and extending below the normal level of the battery electrolyte; means for closing the upper end of the body and including two lead wires; a resistance element located in the cell member and connected with the lead wires; and a bushing threadedly engaging the internally threaded filler opening for retaining the body upon the cover flange, said bushing being spaced from the body to permit venting the battery.

2. A resistance unit for use in a battery charging system having a voltage regulator sensitive to battery temperature comprising, a battery cell cover having an internally threaded filler opening and having an internal annular flange; a tubular body of acid resisting material adapted to be mounted in the filler opening, said body having, intermediate its ends, an external annular flange adapted to be supported by the flange of the cover with a gasket therebetween, said flange providing a vent passage not covered by the gasket, said body extending above and below the cell cover; a cell member attached to and closing the lower end of the body and extending below the normal level of the battery electrolyte when the unit is installed, said cell member having relatively thin walls of acid-resisting material so that the interior of the cell is sensitive to battery temperature, a resistance element located in the cell member and having lead wires extending through the body; a sealing grommet through which the lead wires extend and closing the upper end of the body; and a bushing having threaded engagement with the filler opening and bearing against the external flange of the body for retaining the body against the flange of the cover, said bushing being spaced from the body itself to provide a vent.

3. A resistance unit for use in a battery charging system having a voltage regulator sensitive to battery temperature comprising, a battery cell cover having a filler opening and a skirt, depending a predetermined distance below the underside of the cover and providing a continuation of the filler opening, said cover providing a seat within the skirt; a tubular body of acid resisting material adapted to be mounted in the filler opening, said body having an exterior annular portion located within the skirt and adjacent the seat, said annular portion being provided with a passage for venting the battery; a resistance element carried by the lower end and by the body and extending below the electrolyte level of the battery; a protective shell of acid resisting material cooperating with the body for completely enclosing the element to insure against electrolyte contacting the element; conductors connected with the element and extending through the top of body; sealing means for closing the upper end of the body; and a bushing screwed into the filler opening and having a portion adapted to engage the annular portion of the body to hold the annular portion against the seat and hold the body within the opening, said bushing being spaced from the body and the portion.

WILLIAM J. RADY.
LYMAN A. RICE.

REFERENCES CITED

The following references are of record in the file of this patent:

UNITED STATES PATENTS

| Number | Name | Date |
|---|---|---|
| 1,314,629 | Andres | Sept. 2, 1919 |
| 1,974,187 | Malpass | Sept. 18, 1934 |
| 1,977,898 | Seniff | Oct. 23, 1934 |